United States Patent [19]

Walther

[11] 3,737,761
[45] June 5, 1973

[54] VOLTAGE ADAPTOR CIRCUIT

[75] Inventor: Dieter H. Walther, 851 Furth, Germany

[73] Assignee: International Standard Electric Corporation, New York, N.Y.

[22] Filed: Apr. 19, 1972

[21] Appl. No.: 245,359

[52] U.S. Cl..................307/130, 307/75, 307/252 B, 307/252 T, 323/19, 323/24, 323/25, 323/39
[51] Int. Cl..............................H02j 3/04, G05f 5/00
[58] Field of Search......................307/75, 100, 104, 307/128, 130, 252 B, 252 T; 318/105, 106, 109, 110, 440, 442; 323/16, 19, 22 SC, 23, 24, 25, 34, 36, 39, 76

[56] References Cited

UNITED STATES PATENTS 3,248,631   4/1966   Tolmie...............................318/442

*Primary Examiner*—Gerald Goldberg
*Attorney*—C. Cornell Remsen, Jr., Walter J. Baum, Paul W. Hemminger et al.

[57] ABSTRACT

An electrical circuit for automatically adapting an inductive load to that of one of two possible A.C. supply voltages applied across the circuit. The circuit comprises a capacitor connected in series with the load. The capacitor value is such that a series resonant circuit is formed with the load at a frequency of operation. A controlled semiconductor device having a pair of terminals and a gate terminal is connected with the pair of terminals in parallel across the capacitor. The gate terminal is connected through a non-linear current-voltage characteristic electrical component to one of the terminals of the A.C. supply voltage. For the lower A.C. supply voltage, the capacitor and inductor form a series resonant circuit and at the higher A.C. supply voltage, the controlled semiconductor device short circuits the capacitor.

5 Claims, 1 Drawing Figure

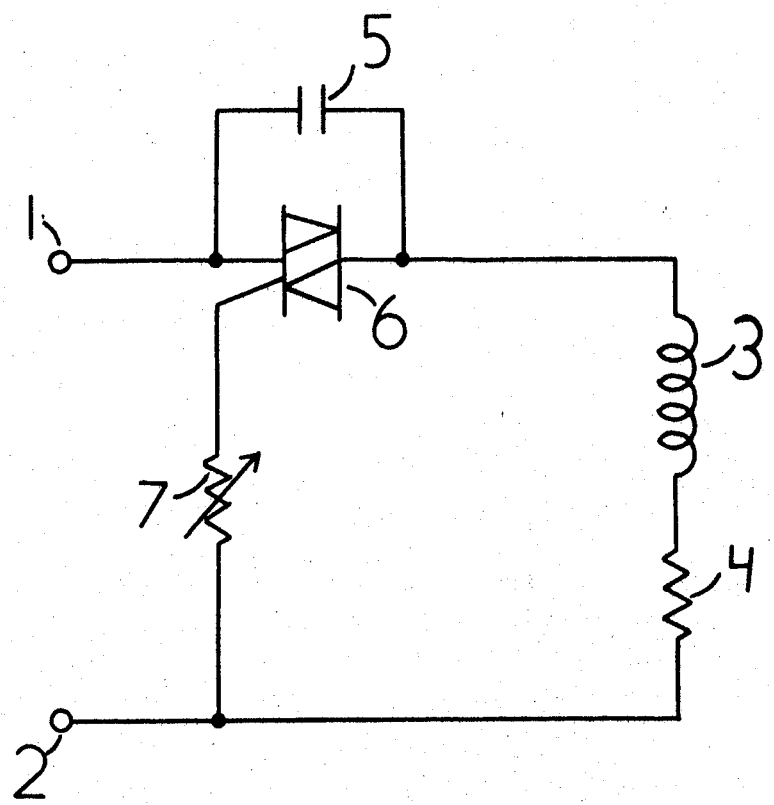

VOLTAGE ADAPTOR CIRCUIT

The invention relates in general to a circuit for automatically adapting to one of two possible A.C. supply voltages.

BACKGROUND OF THE INVENTION

Portable electrical equipment is often required to be selectively connectible to two different sources of supply voltages. Heretofore, such equipment is provided with a changeover device so as to be selectably connectible to an A.C. (alternating-current) supply voltage of either 110 or 220 volts. When the equipment was utilized with the incorrect voltage and the changeover device not utilized, the equipment could be damaged or destroyed if the equipment was set up for a lower voltage supply and connected to an A.C. supply of a higher voltage.

In order to overcome the attendant disadvantages of prior art equipment intended for utilization with more than one value of A.C. supply voltage, the present invention allows the voltage changeover to automatically occur by means of a suitable circuit arrangement, so that failure of equipment cannot occur. The present invention relates to an electrical circuit utilized in combination with an inductive load wherein when an A.C. supply voltage is connected to the load through the circuit, damage to the equipment cannot occur. Such loads could be electrical driving motors such as that utilized in electrical razors.

SUMMARY OF THE INVENTION

The invention comprises an electrical circuit for automatically adapting an inductive load to one of two possible A.C. supply voltages. A capacitor is connected in series with the inductive load, the capacitor being of such value that a series resonant circuit is formed with the load and is resonant at the lower A.C. voltage. A controlled semiconductor device is connected in parallel across the capacitor. (The controlled semiconductor device may be of a bi-directional semiconductor switch form known more commonly as a "triac"). The semiconductor device further comprises a gate which is connected through an electrical component having a non-linear current-voltage characteristic to one side of the A.C. supply voltage. The other side of the A.C. supply voltage is connected to one side of the capacitor. The non-linear electrical component may be of the form of a voltage-dependent resistor, two series-opposed Zener diodes, or glow lamps. At the lower A.C. supply voltage, the capacitor and the inductive load form a series-resonance circuit. This resonant results in an increase in voltage across the inductor. When the higher A.C. supply voltage is connected to the circuit, a considerably higher current will flow through the non-linear electrical component causing the controlled semiconductor device to change to a conducting state which in turn acts as a short circuit across the capacitor, and the voltage at the input of the circuit is connected directly to the load. In this manner an automatic adaptation to the respective A.C. supply voltages is affected.

The advantages of the invention, both as to its construction and mode of operation, will be readily appreciated as the same becomes better understood by reference to the following detailed description when considered in connection with the accompanying drawing.

BRIEF DESCRIPTION OF THE DRAWING

The circuit depicts a preferred embodiment of the invention for use with different A.C. supply voltages.

DESCRIPTION OF THE PREFERRED EMBODIMENT

Referring now to the drawing, there is shown in the figure an electrical circuit wherein two possible A.C. supply voltages may be connected across a pair of input terminals 1, 2 for use across an inductive load which may be represented by an inductor 3 and a series resistor 4. One side of the inductor 3 is connected through a series capacitor 5 to one of the input terminals 1. The other input terminal 2 is connected to the other side of the resistor 4. Further, a controlled semiconductor device 6 typically a bi-directional semiconductor switch commonly known as a triac, is connected with a pair of its terminals across the capacitor 5. In addition, a gate terminal of the switch 6 is connected to one side of an electrical component 7 which contains a non-linear current-voltage characteristic. Typically, the component 7 may be of the form of a voltage-dependent resistor, two series-opposed Zener diodes or a glow lamp. The other side of the electrical component 7 is connected to the terminal 2. The electrical component 7 normally has a great current change in the range between the two A.C. voltages which are connected across the terminals 1 and 2. Typically, the A.C. voltages connected across the terminals 1 and 2 would be either 110 volts, or 220 volt source, although, of course, other voltage sources could be used. The electrical circuit is such that the value of the capacitive reactance of capacitor 5 is equal to the value of the inductive reactance of the inductor 3 at the frequency employed so that at the lower A.C. supply voltage, a series resonant circuit is formed. The resonance, of course, results in a much higher voltage than the input supply voltage appearing across the inductor 3. The voltage at resonance is normally a function of the resistor 4. That is, with $X_1 = X_c$, the current through the inductor is primarily controlled by the value of the A.C. supply voltage divided by the value of the resistor 4. When the higher A.C. voltage supply is connected across the terminals 1 and 2, a considerably higher current will flow through the non-linear component 7 causing the semiconductor switch 6 to change to a conductive state, thereby shorting out the capacitor 5. Therefore, the voltage across the terminals 1 and 2 are almost entirely across the inductor 3, neglecting the small voltage drop across the resistor 4.

Changeover of the voltage across the inductive load 3 automatically occurs when the equipment is connected to a source of A.C. voltage so that the risk of any false operation and consequently, destruction of the equipment is eliminated. Further, since the load is dimensioned for the higher A.C. supply voltage, failure of the components 5 or 6 due to a short circuit cannot cause any damage to the load.

What is claimed is:

1. An electrical circuit for automatically adapting an inductive load to one of two possible A.C. supply voltages comprising:

a capacitor connected in series with said load, said capacitor value being such that a series resonant circuit formed with the inductive load is at resonance at the lower A.C. voltage, a controlled semiconductor device having a pair of terminals connected across said capacitor, and a gate terminal, the gate terminal of said semiconductor device being connected through an electrical component having a non-linear current-voltage characteristic to one side of the A.C. voltage supply, wherein said controlled semiconductor device is utilized to short circuit said capacitor at said higher of said two possible A.C. voltages.

2. An electrical circuit in accordance with claim 1 wherein said component having a non-linear current-voltage characteristic is a voltage-dependent resistor.

3. An electrical circuit in accordance with claim 1 wherein said component having a non-linear current-voltage characteristic comprises a pair of series-opposed Zener diodes.

4. An electrical circuit in accordance with claim 1 wherein said component having a non-linear current-voltage characteristic comprises a glow lamp.

5. An electrical circuit in accordance with claim 1 wherein said controlled semiconductor device is a bi-directional semiconductor switch.

* * * * *